3,097,922
PROCESS FOR THE PREPARATION OF MINERAL PHOSPHATES INTENDED FOR THE MANUFACTURE OF PROSPHORIC ACID BY THE WET METHOD

Pierre Beetz, Liege, Belgium, assignor to Panmetals and Processes Inc., Panama, Panama, a company of Panama
No Drawing. Filed Aug. 12, 1960, Ser. No. 49,154
Claims priority, application France Aug. 14, 1959
5 Claims. (Cl. 23—165)

This invention relates to the preparation of mineral phosphates intended for the manufacture of phosphoric acid by the wet method.

A principal object of the invention is to eliminate the disadvantages resulting from the formation of froth in the manufacture of phosphoric acid by the wet method, i.e., by treating the phosphate with sulphuric acid.

The reactions taking part in this manufacture can be as follows:

(1) $Ca_3(PO_4)_2 + 3H_2SO_4 + 6H_2O \rightarrow 3CaSO_4 \cdot 2H_2O + 2H_3PO_4$
(2) $CaCO_3 + H_2SO_4 + H_2O \rightarrow CaSO_4 \cdot 2H_2O + CO_2 \uparrow$
(3) $3CaF_2 + SiO_2 + 3H_2SO_4 + 4H_2O \rightarrow 3CaSO_4 \cdot 2H_2O + H_2SiF_6$ (4) 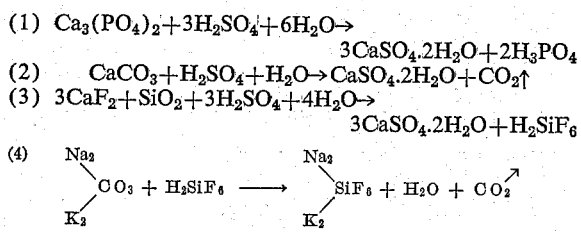

It will be understood that the relative importance of these reactions varies in accordance with the composition of the phosphates in question, the following table giving several characteristic analyses for typical phosphates.

| | Apatite | Sedimentary Rocks | | | |
|---|---|---|---|---|---|
| | Kola, percent | Casablanca 75 B.P.L., percent | Floride Coronet 67 B.P.L., percent | Gafsa 60 B.P.L., percent | Oron, percent |
| $P_2O_5$ | 39.4 | 34.2 | 30.8 | 27.80 | 24.10 |
| CaO | 51.4 | 51 | 46.4 | 47.40 | .53 |
| $CO_2$ | | 4.1 | 5 | 8.60 | 15 |
| Organic matter | | | 1.5 | 0.90 | 1.60 |
| F | 3.35 | 4.2 | 3.9 | 4 | 3.12 |
| $SiO_2$ | 5.1 | 3.1 | 7.1 | 3.90 | 0.90 |
| $Na_2O$ | 0.43 | 1.2 | (¹) | 0.92 | 0.70 |
| $K_2O$ | | | | 0.13 | 0.05 |

¹ Not determined.

It will be noticed that some of the sedimentary phosphates contain appreciable amounts of organic matter, which, during the reaction with the sulphuric acid, decompose, with release of $CO_2$.

The gaseous $CO_2$ produced by reactions (2) and (4), as well as that resulting from the decomposition of the organic matter, sets up the formation of froths in the reaction pulp, which froths are very troublesome, whether because they can cause the vessels to overflow, because they make the pulp unsuitable to be handled by centrifugal pumps, or because they prevent the normal working of the reaction process of the phosphate with the sulphuric acid and the crystallization of the resultant calcium sulphate.

Attempts have been made to minimize the unfortunate effect of these froths by devices such as keeping the pulp dense and adding anti-frothing agents. These devices, which always complicate the operation, can help to some extent the treatment of phosphates containing between 0 and 5% $CO_2$, which however still remains difficult, but they do not enable phosphates with a higher content of $CO_2$ to be used, under conditions that are technically and economically acceptable, for the manufacture of phosphoric acid.

The invention is directed to a process that permits the use industrially of such phosphates havng a high content of $CO_2$ and even of organic matter also, while still facilitating the treatment of phosphates containing 0 to 5% of $CO_2$.

Because difficulties arise due to the forth formed in the reaction vessels by the $CO_2$ released therein, the invention envisages subjecting the phosphates to a preliminary treatment with phosphoric acid to effect the release of the major part of the $CO_2$, so that the mass that has been subjected to this preliminary treatment can then be treated without difficulty by the usual process. The invention also envisages subjecting the reaction mass, during the preliminary treatment, to mechanical agitation, preferably in a paddle mixer with a horizontal axis, to work on the whole volume in which froths could form, so as to ensure effective destruction of the froths that do form. The invention makes use of the fact that $CaCO_3$ reacts more rapidly than $Ca_3(PO_4)_2$, so that it is possible to effect substantially complete decomposition of the $CaCO_3$ without converting any great amount of the tricalcium phosphate into monocalcium phosphate. It will be understood that it is obviously impossible to limit precisely the reaction to the decomposition of the $CaCO_3$ and that, accordingly as the latter is more completely decomposed, a greater proportion of tricalcium phosphate is simultaneously attacked by the acid. According to the invention, it is thus possible to make use of an excess of phosphoric acid with respect to the $CaCO_3$, by virtue of the more rapid reaction of the latter, provided that the length of the preliminary treatment be reduced to the time required for the desired decomposition of the $CaCO_3$, but distinctly insufficient for any great amount of tricalcium phosphate to be decomposed.

The invention can be applied with particular advantage to the continuous process of manufacturing phosphoric acid in which the phosphate mineral is attacked by the sulphuric acid in one or more reaction vessels, and a part of the pulp thus formed is cooled by evaporation and returned into the pulp circuit, generally upstream of the circuit, the pulp being finally subjected to filtering with repeated washings and the weak phosphoric acid produced in the washings being returned into the phosphate treatment vessel.

In its application to a process as just indicated, the invention envisages that the preliminary treatment of the phosphate shall be carried out with the help of an appropriate amount of weak phosphoric acid coming from the washings, while an appropriate proportion of the recycled pulp is introduced into the pre-mixer where the preliminary treatment is carried out, in order to produce combined chemical and mechanical effects as will be described below.

The weak phosphoric acid coming from the washings on the filter generally contains about 20 to 23% of $P_2O_5$ and 1.5 to 2.5% of excess $SO_3$ in the form of $H_2SO_4$.

The recycled pulp comprises:
(a) A solid phase (gypsum) corresponding to about 40% of the weight of the pulp, and (b) a liquid phase corresponding to about 60% of the weight of the pulp and consisting of phosphoric acid containing about 30 to 32% by weight of $P_2O_5$ and about 2 to 3% by weight of excess $SO_3$ in the form of $H_2SO_4$.

These numerical data are quoted to give a general idea, but obviously the process can be adapted to the use of weak phosphoric acid and pulp having other characteristics. The same numerical data will, however, be retained in the example of the carrying out of the process according to the invention to be described below.

The phosphoric and sulphuric acids present in the weak acid and in the liquid phase of the pulp, having the above approximate amounts, expressed as usual as anhydrides, i.e. as $P_2O_5$ and $SO_3$, react in the following order.

(2) $CaCO_3 + H_2SO_4 + H_2O \rightarrow CaSO_4.2H_2O + CO_2\uparrow$

The remaining calcium carbonate reacts with the phosphoric acid:

(5) $CaCO_3 + 2H_3PO_4 \rightarrow Ca(H_2PO_4)_2 + H_2O + CO_2\uparrow$

The excess phosphoric acid reacts with the tricalcium phosphate to convert it into monocalcium phosphate:

(6) $Ca_3(PO_4)_2 + 4H_3PO_4 \rightarrow 3Ca(H_2PO_4)_2$

Because of the relative amounts expressed as $P_2O_5$ and $SO_3$, the major proportion of the calcium carbonate is converted to monocalcium phosphate and only the fraction that is attacked by the excess $SO_3$ inevitably present in the phosphoric acid results in the formation of calcium sulphate. It is very important that this amount of calcium sulphate formed in the pre-mixer be reduced to a minimum, because the reaction conditions in the pre-mixer do not permit gypsum crystals to form that are well suited to very easy subsequent filtration, which is very necessary in the process. For this reason, of all the reagents used in the manufacture of phosphoric acid, only the sulphuric acid is not introduced into the pre-mixer and there is only tolerated the presence of $SO_3$ inevitably contained in the phosphoric acid coming from the washings; it is essential that this amount of $SO_3$ shall not exceed 15% of the total amount of $SO_3$ to be introduced in the form of sulphuric acid into the reaction vessels, for fear of substantially reducing the rate of filtration of the gypsum. To make as certain as possible that this rate of filtration is not affected, it is wise to limit the amount of $SO_3$ passing into the pre-mixer to 10% of that contained in the $H_2SO_4$ introduced into the reaction vessel of the process for manufacturing the phosphoric acid by the wet method.

Finally, the phosphoric acid introduced into the pre-mixer serves the purpose of disaggregating the calcium carbonate contained in the phosphate, by a reaction accompanied by release of $CO_2$. The phosphoric acid contained in the liquid phase of the pulp serves precisely the same function, while the solid phase is participating in the mechanical action, now to be further explained.

To effect this mechanical action, it is preferable that the amount of pulp passing into the pre-mixer is so adjusted that the proportion of solids in the pre-mixed product finds itself at practically the same value as in the usual reaction vessels; under these conditions, while maintaining a fluidity conducive to a good reaction, the pulp produced is sufficiently abrasive to abrade the particles of calcium carbonate by the agitation effected by the paddles of the pre-mixer, this speeding up the chemical reaction. The abrasive action removes the pellicle of gelatinous monocalcium phosphate which is formed on the surface of the calcium carbonate containing particles of the phosphate rock as a consequenc of its reaction with phosphoric acid, and so promotes the further or deeper attack of the calcium carbonate.

The above is one part played by the mechanical action, viz., disaggregation of the phosphate. Another essential part played by this mechanical action is in controlling and destroying the froths formed by the fierce release of $CO_2$ in reactions (2), (5), which is such that the volume of the re-actants can increase three-fold in a few seconds and only vigorous agitation of the entire volume in which the froths can form is able to overcome them effectively. Such agitation is easily effected in a mixer with a horizontal axis, whereas it would be very difficult to effect in the usual type of reaction vessel. For this reason, it is preferable to do the agitation in a mixer, notably one with a horizontal axis.

As already indicated, the length of the pre-mixing time is important in obtaining the full advantage of the invention, while mimimizing secondary effects that could be troublesome if they were allowed to develop. The pre-mixing time should be sufficient for reactions (2), (5), to be completed as near as possible, and for the overcoming of the froths resulting from the release of $CO_2$ produced by the reactions. This time must not, however, be too long, because of the danger of destroying by abrasion the gypsum crystals introduced by the pulp, and also of converting into monocalcium phosphate an undue part of the tricalcium phosphate (reaction (6)). In accordance with the phosphate to be treated, the time can vary between 30 and 240 seconds.

The following is an example of carrying out the invention in a proces sin which a proportion of the pulp is recycled, as also the weak phosphoric acid coming from the washings.

To produce 1000 kg. of $P_2O_5$, starting with GAFSA phosphate, there are introduced into the pre-mixer:

(1) 3597 kg. of GAFSA phosphate containing:

27.8% of $P_2O_5$, say 1000 kg.
47.4% of CaO, say 1704 kg.
8.6% of $CO_2$, say 309 kg.

which may be mainly composed of 2183 kg. of $Ca_3(PO_4)_2$ containing 1000 kg. of $P_2O_5$ and 1183 kg. of CaO; and 702 kg. of $CaCO_3$ containing 309 kg. of $CO_2$ and 393 kg. of CaO.

(2) 6139 kg. of weak phosphoric acid containing:

22% of $P_2O_5$, say 1350 kg. of $P_2O_5$
2% of $SO_3$, say 122.78 kg. of $SO_3$ (3) 4196 kg. of pulp containing:

40%, say 1678 kg. of solids, and
60%, say 2518 kg. of acid
30% of $P_2O_5$ corresponding to 755.4 kg. of $P_2O_5$ and
2.6% of $SO_3$ corresponding to 65.47 kg. of $SO_3$.

The acids thus total:

1350 + 755.4 = 2105.4 kg. of $P_2O_5$, and
122.78 + 65.47 = 188.25 kg. of $SO_3$ Reactions (2), (5), and (6) can involve the following quantities of materials:

(2)

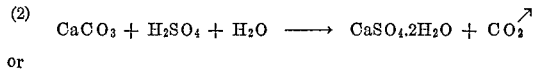

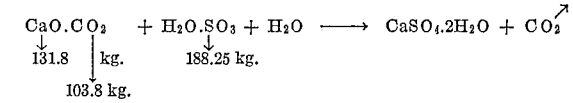

(5)

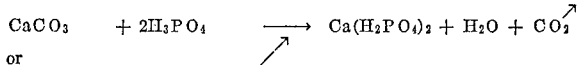

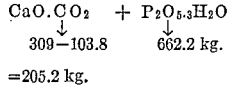

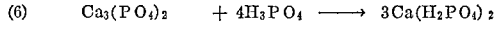

= 205.2 kg.

(6)

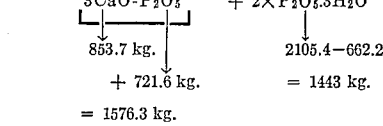

= 1576.3 kg.

It is seen that the $SO_3$ of reaction (2) only involves 131.8 kg. of CaO, i.e., 7.73% of the 1704 kg. of CaO present in the phosphate. The $P_2O_5$ present has effected the decomposition of the carbonate according to reaction (5) and the excess can possibly have attached a proportion of the tricalcium phosphate, which cannot have exceeded 1575.3 kg., or $$\frac{1575.3}{2189} = 72\%$$

of the $Ca_3(PO_4)_2$ contained in the phosphate, but is substantially lower due to the limited reaction time of about 30–240 seconds.

Weight of pulp: $3597+6139+4196=13932$ kg.
Weight of solids: $3597+1678=5275$ kg.
Proportion of solids:

$$\frac{5275}{13932} = 37.86\%$$

As to the time, this should be limited to about one minute, which gives time for the desired release of $CO_2$ to take place, whilst enabling the formation of froths to be effectively overcome, it being evident in this case that any extension of the pre-mixing time would only needlessly prolong reaction (6).

The pulp thus produced can be introduced into the reaction vessel, where it is attacked by the sulphuric acid without setting up violet frothing. At the most, there is only observed a certain amount of distension in the mass of the pulp in the reaction vessel, but sufficiently weak not to trouble the operation in the vessel.

I claim:

1. A process for the manufacture of phosphoric acid from calcium carbonate containing mineral phosphate comprising reacting mineral phosphate with sulphuric acid in a reaction zone, washing and filtering the resulting pulp and recovering phosphoric acid solution therefrom, the mineral phosphate being submitted to a preliminary treatment in a pre-mixing zone for about 30–240 seconds by mixing the same with phosphoric acid and a substantial amount of pulp recycled directly from the reaction zone and before filtering, the latter said pulp comprising a substantial solid phase consisting substantially of gypsum crystals and a liquid phase consisting substantially of phosphoric acid and sulphuric acid, and agitating the mixture to abrade the phosphate with the solid phase and to purge $CO_2$ therefrom and to destroy froth which has formed, the $SO_3$ introduced into the pre-mixing zone being limited to less than about 15% of the $SO_3$ introduced by the sulphuric acid in the reaction zone.

2. A process as claimed in claim 1, in which the $SO_3$ introduced into the pre-mixing zone is less than 10% of the $SO_3$ introduced by the sulphuric acid in the reaction zone.

3. A process as claimed in claim 1, in which the phosphoric acid used in the pre-mixing zone is weak phosphoric acid recycled from phosphoric acid solution resulting from said filtering of pulp issuing from the reaction zone.

4. A process as claimed in claim 1, in which the amount of phosphoric acid in the pre-mixing zone is in excess of that necessary for decomposing the $CaCO_3$ therein.

5. A process as claimed in claim 1 wherein the recycled pulp comprises at least about 40% of a solid phase.

References Cited in the file of this patent
UNITED STATES PATENTS

| | | |
|---|---|---|
| 2,710,247 | Knowles et al. | June 7, 1955 |
| 2,886,426 | Gera | May 12, 1959 |
| 2,887,362 | Lee | May 19, 1959 |
| 2,913,330 | Wilson | Nov. 17, 1959 |